US009133826B2

United States Patent
Munk-Hansen et al.

(10) Patent No.: US 9,133,826 B2
(45) Date of Patent: Sep. 15, 2015

(54) COOLING ARRANGEMENT OF A WIND TURBINE

(75) Inventors: Thorkil Munk-Hansen, Give (DK); Jacob Blach Nielsen, Engesvang (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 650 days.

(21) Appl. No.: 13/454,385

(22) Filed: Apr. 24, 2012

(65) Prior Publication Data
US 2012/0282095 A1 Nov. 8, 2012

(30) Foreign Application Priority Data
May 6, 2011 (EP) .................................... 11165132

(51) Int. Cl.
F03D 11/00 (2006.01)

(52) U.S. Cl.
CPC ............. *F03D 11/00* (2013.01); *F05B 2240/14* (2013.01); *F05B 2240/916* (2013.01); *F05B 2260/20* (2013.01); *Y02E 10/721* (2013.01); *Y02E 10/722* (2013.01); *Y02E 10/726* (2013.01); *Y02E 10/728* (2013.01); *Y02T 50/675* (2013.01)

(58) Field of Classification Search
CPC .......... F05B 2260/20; F05B 2260/224; F05B 2260/2241; F03D 11/00; F03D 11/04
USPC ....................................... 290/44, 55; 415/220
See application file for complete search history.

(56) References Cited

U.S. PATENT DOCUMENTS

| 8,371,820 | B2* | 2/2013 | deBuhr et al. ............. 416/244 R |
|---|---|---|---|
| 8,636,468 | B2* | 1/2014 | Munk-Hansen ................ 416/61 |
| 8,690,537 | B2* | 4/2014 | Munk-Hansen ................ 416/95 |
| 8,814,516 | B2* | 8/2014 | Lind ............................... 416/95 |
| 8,920,120 | B2* | 12/2014 | Munk-Hansen ................ 416/95 |
| 2011/0123336 | A1* | 5/2011 | Munk-Hansen ................ 416/95 |
| 2012/0063890 | A1* | 3/2012 | Sivalingam et al. .......... 415/177 |
| 2012/0086215 | A1* | 4/2012 | Sivalingam et al. ............ 290/55 |
| 2012/0152651 | A1* | 6/2012 | Jensen et al. ................... 182/113 |
| 2012/0280511 | A1* | 11/2012 | Eriksen .......................... 290/55 |
| 2012/0282095 | A1* | 11/2012 | Munk-Hansen et al. ....... 416/95 |
| 2013/0011272 | A1* | 1/2013 | Mortensen et al. ........ 416/244 R |
| 2013/0015665 | A1* | 1/2013 | Wang .............................. 290/55 |
| 2013/0309090 | A1* | 11/2013 | Abolfazlian et al. ............. 416/1 |
| 2013/0315735 | A1* | 11/2013 | Arndt et al. ............... 416/146 R |
| 2014/0219801 | A1* | 8/2014 | Nyvad et al. .................... 416/95 |

FOREIGN PATENT DOCUMENTS

| DE | 102006034299 A1 | 1/2008 |
|---|---|---|
| EP | 1134410 A1 | 9/2001 |
| EP | 2163761 A1 | 3/2010 |
| EP | 2182309 A1 | 5/2010 |
| EP | 2325482 A1 | 5/2011 |
| WO | WO 2009132671 A2 | 11/2009 |
| WO | WO 2010085960 A2 | 8/2010 |

* cited by examiner

*Primary Examiner* — Edward Look
*Assistant Examiner* — Christopher R Legendre

(57) ABSTRACT

A cooling arrangement is provided for a wind turbine. The wind turbine has a nacelle. The cooling arrangement includes a cooling device and a platform. The cooling device is arranged on top of the nacelle and which is configured to remove heat of the wind turbine to the ambient air. The platform is located on top of the nacelle and which is configured to be approached by a helicopter. The platform includes a barrier, which surrounds at least a part of the platform. The barrier includes at least a part of the cooling device.

14 Claims, 5 Drawing Sheets

COOLING ARRANGEMENT OF A WIND TURBINE

CROSS REFERENCE TO RELATED APPLICATIONS

This application claims priority of European Patent Office application No. 11165132.9 EP filed May 6, 2011. All of the applications are incorporated by reference herein in their entirety.

FIELD OF INVENTION

The invention relates to a cooling arrangement of a wind turbine.

BACKGROUND OF INVENTION

Electrical machinery produces heat and often needs a cooling system to remove the heat. The cooling system often comprises a cooling fluid that circulates in ducts or pipes. The cooling system further comprises a cooling arrangement as a heat sink. The cooling arrangement comprises a radiator and a support arrangement. The cooling fluid is then cooled by air flowing though the radiator. The radiator is therefore mounted in a way that the surrounding air can flow through the radiator.

In the case of e.g. a wind turbine, the cooling system removes the heat from the generator or a bearing. The cooling fluid is cooled in the radiator. The radiator is mounted outside of the nacelle so that the surrounding air can move through the radiator.

Wind turbines are often installed offshore or close to the coast and are surrounded by salty air. One aim of the installation is to keep salty air out of the nacelle, as salty air will damage the installation in the nacelle. For this the radiator of the cooling system is mounted outside of the nacelle, so no salty air has to be guided through the nacelle.

SUMMARY OF INVENTION

To ensure a reliable cooling by the surrounding air moving through the radiator, the radiator is mounted in a way that the surrounding air can easily flow through the radiator. The radiator is mounted mainly in the right angle of the direction of the air flow when the turbine is in operation. The radiator is mounted on top of the nacelle to use the maximum of the air flow and to provide a good access for maintenance.

The same aspects apply for other arrangements where cooling systems are used. A radiator of a cooling system is often installed in a higher area of a building or construction, e.g. on a roof.

As e.g. wind turbines are often installed offshore they are equipped with a heli-pad, a heli-drop-zone or a heli-hoist platform. These platforms are used with a helicopter to land on the platform or to drop or pick up persons or parts by the help of a hoist. It is also possible to use the platform with a crane to hoist or lower gear like technical equipment to the platform by a rope. This is to provide an easy way to deliver or pick up parts or persons, for service or repair reasons.

The platform is located on top of the nacelle at the rear end of the nacelle. The rear end of the nacelle is the end pointing away from the hub and the rotor, to avoid interference with the rotor.

A free space of a certain size is needed to deliver or pick up persons or equipment at a platform. Thus accidents and damages are avoided. A barrier is arranged around the platform to avoid that persons or equipment slip from the edge of the platform.

A hatch is arranged in the nacelle at the front end of the platform, to allow an easy access from the platform into the nacelle and from the nacelle to the platform. The front end of the platform is the end that points towards the hub of the wind turbine.

This has the disadvantage that the radiator of the cooling system and the platform take up the same area on top of the wind turbine. The radiator is diminishing the space needed for the platform. At the same time the barrier (e.g. a rail) around the platform is diminishing the area of free air to move through the radiator.

The aim of this invention is to provide a cooling arrangement that provides a reliable cooling and is not limiting the possibilities to use a platform.

The aim is reached by the features of the independent claim. Preferred embodiments of the invention are described in the dependent claims.

According to the invention a cooling arrangement of a wind turbine is provided. The wind turbine comprises a nacelle and a cooling device, which is arranged on top of the nacelle. The cooling device is prepared to remove heat of the wind turbine to the ambient air.

A platform is located on top of the nacelle. It is prepared to be approached by a helicopter. The platform comprises a barrier, which surrounds at least a part of the platform. The barrier comprises at least a part of the cooling device.

Thus the cooling device is a part of the barrier. Thus no separate barrier and separate cooling device is needed while extra material is avoided. Thus the weight, the costs and working time to prepare and install the separate barrier and the separate cooling device are saved.

Preferably the cooling device comprises a radiator segment and a support structure to support the radiator segment. Thus the radiator is mounted via a support structure to the nacelle or to the barrier. Thus the radiator can be exchanged easily in case of a fault.

Preferably at least a part of the radiator of the wind turbine is an integral part of the barrier.

Preferably an internal cooling system of the wind turbine is connected with the cooling device or radiator. Thus at least two coupled cooling circuits are used to remove heat out of the nacelle or wind turbine. Each cooling circuit might use a specific cooling fluid like water, oil and/or air. Thus there is no need to use salty air from the outside of the nacelle for internal cooling purposes.

Preferably the barrier is arranged at three sides of the platform. A remaining fourth side is left free to provide access from a hatch to the platform.

Preferably, the radiator is arranged at the rear part of the platform as the barrier. Thus the wind, which moves along the nacelle to cool the radiator when the turbine is in operation, moves easily along the platform and reaches the cooling device. Thus the surface of the cooling device is arranged frontal to the direction of the ambient air when the wind turbine is in operation.

Preferably, the radiator is arranged at the front part of the platform as the barrier. Thus the wind can easily flow through the rotor and directly to the cooling device when the turbine is in operation. Thus the wind is not blocked before it reaches the radiator.

Preferably the support structure comprises a triangular shaped side support, which is prepared to absorb the wind load of the ambient air passing through the radiator. Thus forces, being generated by the wind load, are transferred from the radiator over the support structure to the nacelle of the wind turbine. In addition the use of material and the weight is optimized.

Preferably the cooling device is arranged with a certain spacing to the nacelle. Thus air is allowed to move between the cooling device and the nacelle. Thus low turbulence airflow is provided. The airflow of the ambient air around the radiator is optimized and a congestion of the airflow is avoided.

Preferably the cooling device is partially arranged in a groove of the nacelle to achieve a predefined distance between the level of the platform and the top edge of the cooling device. Thus a limitation of the maximum height of the barrier in respect to the platform is observed. In addition a large radiator area can be provided while mandatory constructional dimensions are kept.

In another embodiment the platform is elevated in respect to the cooling device to achieve a predefined distance between the level of the platform and the top edge of the cooling device. Thus a limitation of the maximum height of the barrier in respect to the platform is observed. In addition a large radiator area can be provided while mandatory constructional dimensions are kept.

Preferably the barrier comprises a metal grid. Thus the air of a hovering helicopter can move through the barrier. Thus congestion of the air is prevented. Thus complex turbulent airflow and ground effects are prevented for the helicopter.

Preferably, the metal grid comprises openings of a certain size, which prevents that a grounding hook or a grounding conductor of a helicopter, which is hovering over the platform, is entangled or gets entangled. Thus, neither the hook nor grounding conductor get entangled and thus may move freely. Dangerous situations for the helicopter are avoided.

Preferably a floor of the platform comprises a hole to drain water. Thus the danger of slipping of persons or equipment on the wet surface is minimized.

Preferably a grid is prepared as floor of the platform. Thus friction of equipment and shoes of persons is higher then on a plane metal surface. Thus sliding and slipping of equipment and persons is minimized.

BRIEF DESCRIPTION OF THE DRAWINGS

The invention is shown in more detail by help of figures. The figures show preferred configurations and do not limit the scope of the invention.

DETAILED DESCRIPTION OF INVENTION

Figure 1:
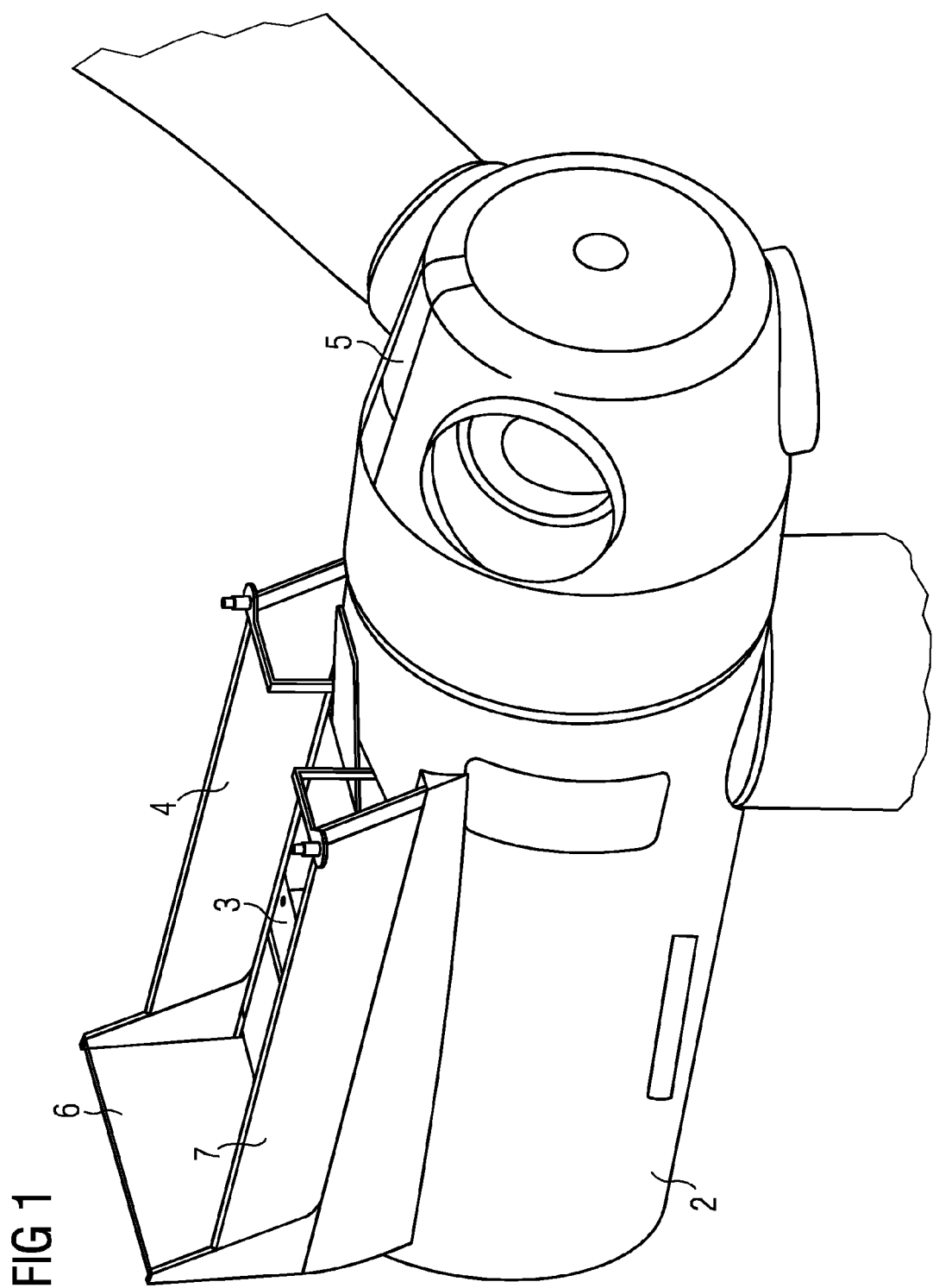
FIG. 1 shows a nacelle of a wind turbine according to the invention.

FIG. 1 shows a nacelle 2 of a wind turbine according to the invention. The nacelle 2 comprises a platform 3 that is surrounded by a barrier 4. The rear end of the platform is the part pointing away from the hub 5.

A cooling device 6 is provided on top of the nacelle 2. This cooling device 6 is an integral part of the rear part of the barrier 4. The barrier 4 surrounds the platform 3 at three sides. At the right and left side the barrier comprises a metal grid 7, so that the air flow of a hovering helicopter can move through the barrier 4.

Figure 2:
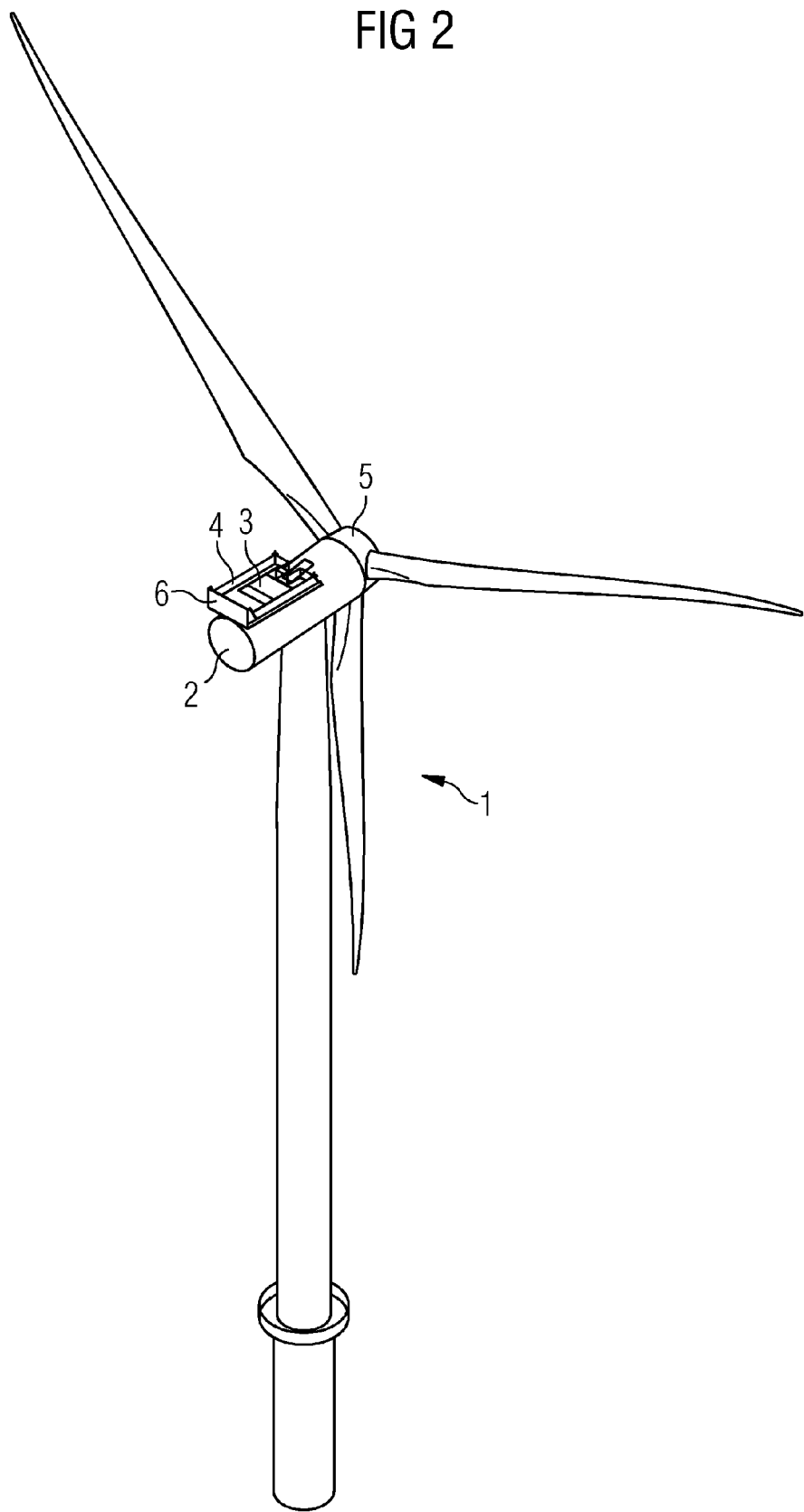
FIG. 2 shows a wind turbine according to the invention.

FIG. 2 shows a wind turbine 1 according to the invention. The wind turbine 1 is equipped with a platform 3 on top of the nacelle 2. The platform 3 is surrounded by a barrier 4.

The platform 3 can be approached by a helicopter. The platform 3 can be prepared to land on it with the helicopter. Or it is prepared to be used as a heli-drop zone or a heli-hoist platform to deliver or pick up equipment and personnel to and from the platform.

A cooling device 6 is provided at the rear end farthest away from the hub 5 of the wind turbine 1. This cooling device 6 is integrated in the barrier 4 and forms a part of the barrier 4.

Figure 3:
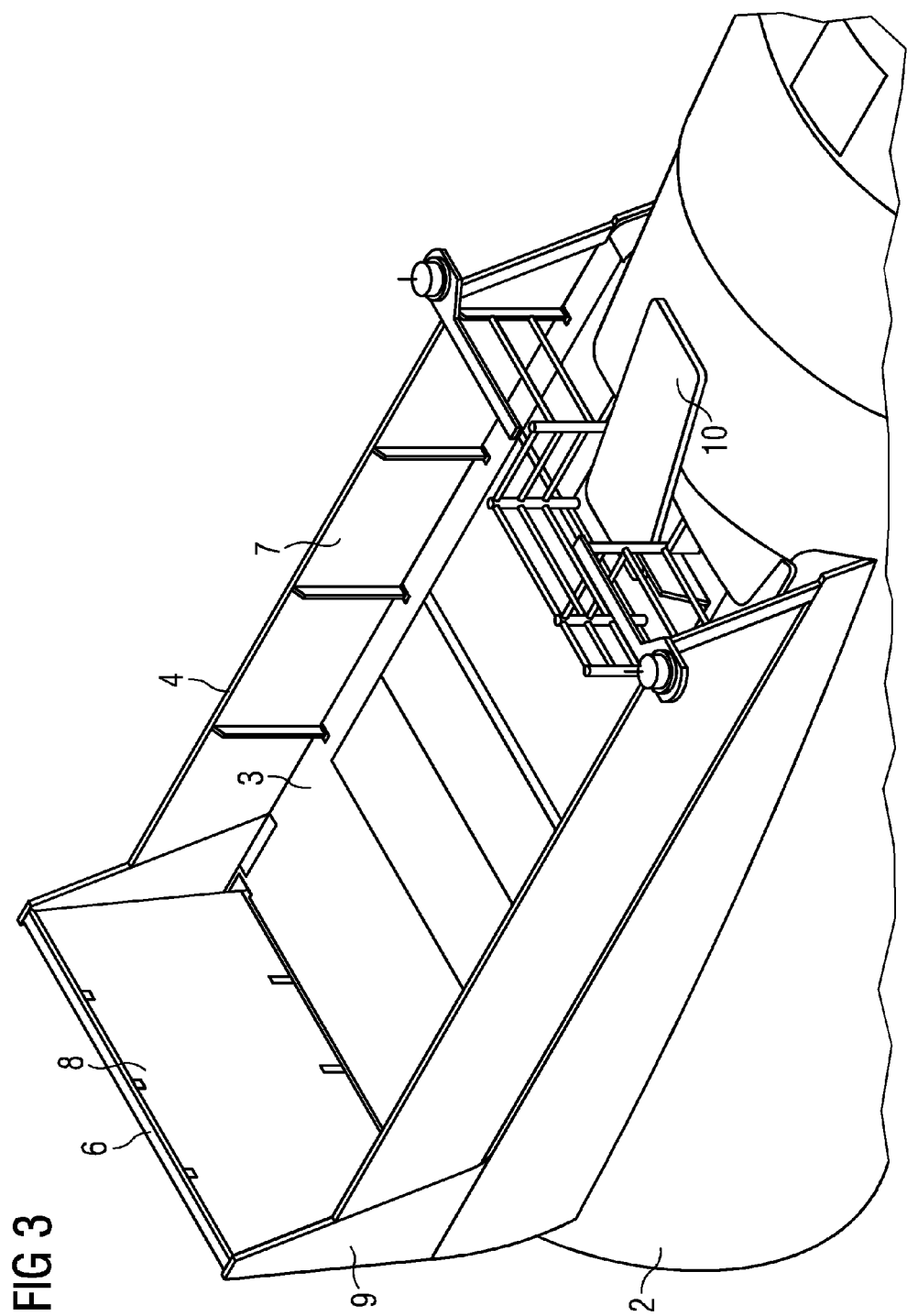
FIG. 3 shows a platform according to the invention in a first view.

FIG. 3 shows a platform 3 according to the invention in a first view. The nacelle 2 is equipped with a platform 3. Around the platform 3 is the barrier 4.

At the rear part of the barrier 4 a cooling device 6 is arranged as a part of the barrier 4. The cooling device 6 comprises a radiator 8 and a support structure 9. The radiator 8 can be constructed of several radiator elements.

The barrier 4 comprises metal grids 7. The metal grids 7 allow air to flow and thus avoids a congestion of air e.g. from a helicopter hovering above the platform 3.

The barrier 4 is surrounding the platform 3 at three sides. The side in the direction of the hub, the front side, is just equipped with a railing. Thus, personnel and equipment can easily reach the platform 3 through the hatch 10.

The cooling device 6 is equipped with a triangular shaped side support 9. This side support 9 takes in the wind load of the ambient air moving through the radiator 8 and leads the forces into the nacelle 2.

Figure 4:
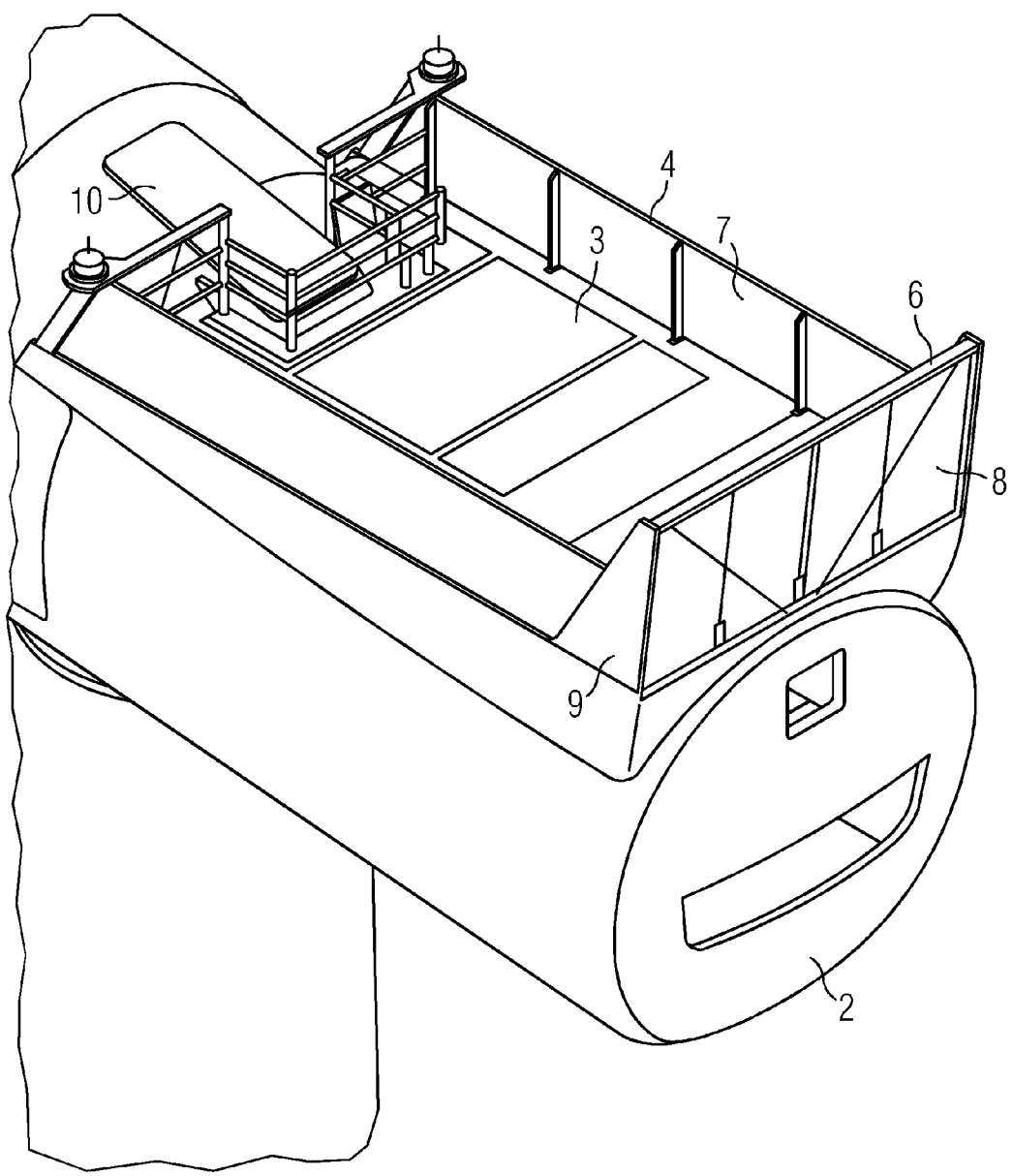
FIG. 4 shows the platform of FIG. 3 in a second view.

FIG. 4 shows the platform of FIG. 3 in a second view. A cooling device 6 is arranged on top of a nacelle 2 of a wind turbine. The cooling device 6 comprises a support structure 9 and a radiator 8. The cooling device 6 is a part of the barrier 4 that surrounds the platform 3.

The barrier 4 surrounds the platform 3 at three sides. Thus the wind, that cools the radiator when the turbine is in operation, can blow through the rotor along the nacelle 2 over the platform 3 and through the radiator 6 without being disturbed by a barrier in front on the platform 3.

Also, personnel can easily reach the platform 3 through the hatch 10 and handle equipment in and out of the nacelle 2. At the side of the hatch 10, the platform 3 is equipped with a railing. On top of this railing additional equipment is installed.

The barrier 4 comprises a metal grid 7 that allows the air to flow through it. Thus the congestion of the air is minimized and complex turbulent air flow and ground effects are prevented for the helicopter hovering above the platform 3.

The metal grid has openings that are small enough so that the grounding hook or the grounding conductor of the helicopter can not get entangled in the grid.

Figure 5:
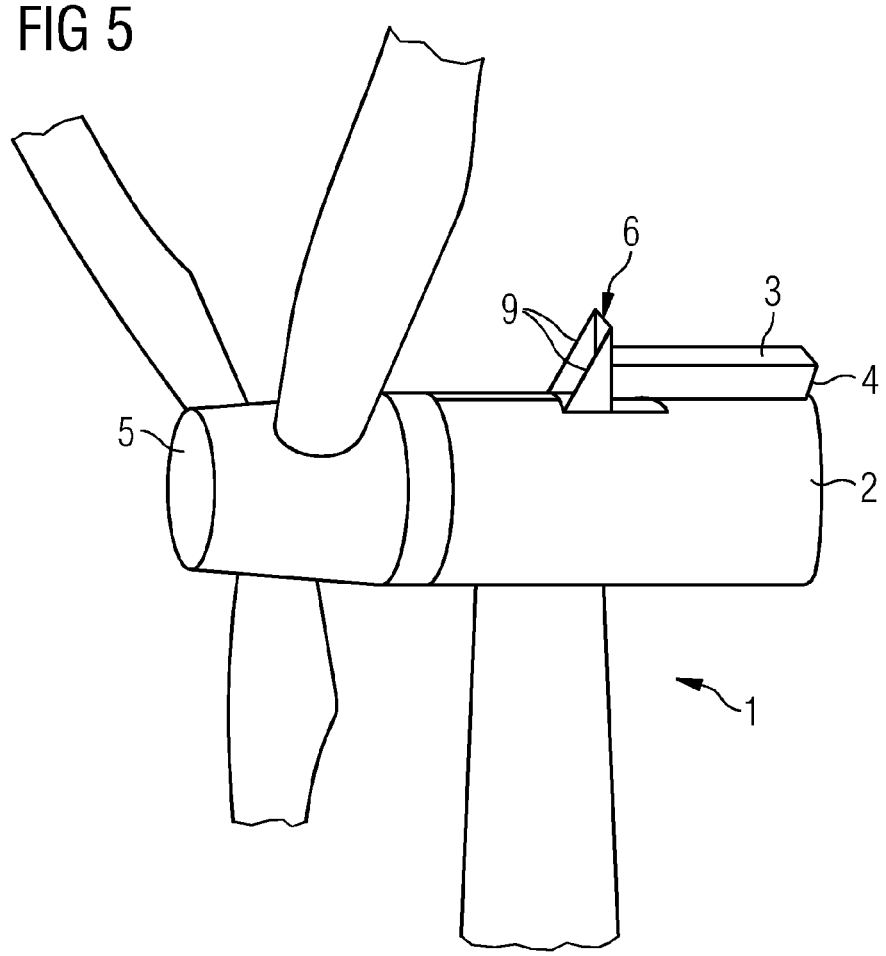
FIG. 5 shows another embodiment of the solution invented.

FIG. 5 shows another embodiment of the solution invented. On top of the nacelle 2 of a wind turbine 1 a platform 3 is installed to be used with a helicopter. The platform is surrounded by a barrier 4. At the front end of the platform, at the end that is pointing towards the hub 5, the barrier 4 is connected to a cooling device 6. Thus the cooling device 6 is a part of the barrier 4 at the front end of the platform. The cooling device is equipped with a triangular shaped support structure 9.

In this embodiment the cooling device 6 is mounted in the front end of the platform 3. When the wind turbine 1 is in operation, the wind can easily flow through the rotor and along the nacelle 2 to the cooling device 6 that comprises the radiator 8. The radiator 8 is arranged mainly fontal to the wind. So the wind provides an optimized cooling effect.

Figure 6:
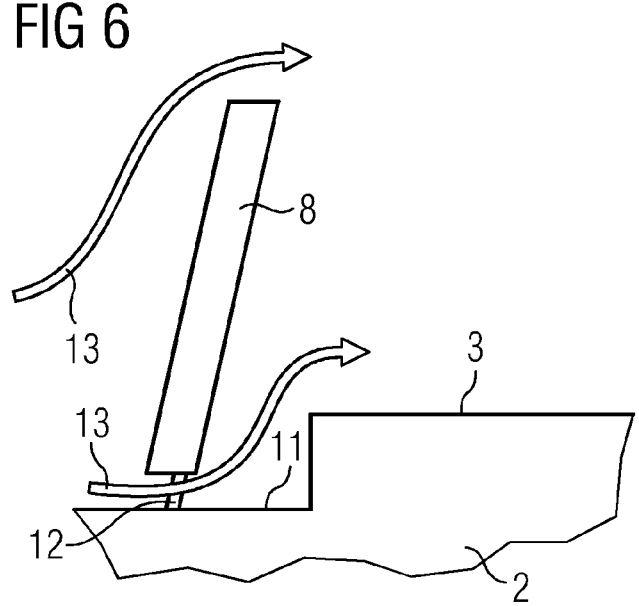
FIG. 6 shows a detail of the solution invented.

FIG. 6 shows a detail of the solution invented. The figure shows a radiator 8 of the cooling device in a side view. Between the radiator 8 and the nacelle 2 is a certain spacing that leads to an air gap 12. This air gap allows the air flow 13 to flow between the radiator 8 and the nacelle 2. Thus the air flow 13 is not blocked in front of the radiator 8. Thus a congestion of air is prevented and the cooling effect is optimized.

The radiator 8 is arranged in a certain level on top 11 of the nacelle 2. In this case the platform 3 is arranged in a higher level on the nacelle 2. The platform 2 is elevated in respect to the cooling device 6. Thus the distance between the upper end of the cooling device 6 and the level of the platform floor can be arranged to have a predetermined maximum distance. Thus requirements regarding the height of the barrier 4 surrounding the platform 3 can be met.

The invention claimed is:

1. A cooling arrangement of a wind turbine, the wind turbine including a nacelle, the cooling arrangement comprising:
   a cooling device, which is arranged on top of the nacelle and which is configured to remove heat of the wind turbine to the ambient air,
   a platform, which is an attachment to the nacelle and is securable to the nacelle over a top portion of the nacelle, and which is configured to be approached by a helicopter,
   a barrier on top of and surrounding at least a part of the platform, and
   wherein the barrier comprises at least a part of the cooling device arranged at a front edge or a rear edge of the platform.

2. The cooling arrangement according to claim 1, wherein the cooling device comprises a radiator segment and a support structure to support the radiator segment.

3. The cooling arrangement according to claim 2, wherein at least a part of the cooling device is an integral part of the barrier.

4. The cooling arrangement according to claim 2, wherein an internal cooling system of the wind turbine is connected with the cooling device.

5. The cooling arrangement according to claim 2, wherein the support structure comprises a triangular shaped side support, which is prepared to absorb the wind load of the ambient air passing through the radiator.

6. The cooling arrangement according to claim 1, wherein the barrier is arranged at three sides of the platform.

7. The cooling arrangement according to claim 1, wherein the cooling device is arranged at the rear edge of the platform.

8. The cooling arrangement according to claim 1, wherein the cooling device is arranged at the front edge of the platform.

9. The cooling arrangement according to claim 1, wherein the cooling device is arranged with a certain spacing relative to the nacelle such that air is allowed to move between the cooling device and the nacelle.

10. The cooling arrangement according to claim 1, wherein
    the cooling device is partially arranged in a groove of the nacelle to achieve a predefined distance between a level of a platform and the top edge of the cooling device, or
    the platform is elevated in respect to the cooling device to achieve a predefined distance between a level of the platform and a top edge of the cooling device.

11. The cooling arrangement according to claim 1, wherein the barrier comprises a metal grid.

12. The cooling arrangement according to claim 11, wherein the metal grid comprises openings of a certain size, which prevents a grounding hook or a grounding conductor of a helicopter, which is hovering over the platform, from being entangled.

13. The cooling arrangement according to claim 1, wherein a floor of the platform comprises a grid.

14. A cooling arrangement of a wind turbine, the wind turbine including a nacelle, the cooling arrangement comprising:
    a cooling device, which is arranged on top of the nacelle and which is configured to remove heat of the wind turbine to the ambient air,
    a platform on top of the nacelle, and
    a barrier surrounding at least a part of the platform,
    wherein the cooling device is partially arranged in a groove of the nacelle to achieve a predefined distance between a level of the platform and a top edge of the cooling device, or
    wherein the platform is elevated with respect to the cooling device to achieve a predefined distance between a level of the platform and a top edge of the cooling device.

* * * * *